(12) United States Patent
Young et al.

(10) Patent No.: US 7,132,953 B2
(45) Date of Patent: Nov. 7, 2006

(54) SPRING SENSOR ASSEMBLY FOR A VEHICLE SEAT CUSHION

(75) Inventors: Oliver J. Young, Grosse Pointe, MI (US); John F. Nathan, White Lake Township, MI (US); Christopher Ricard, Rochester, MI (US)

(73) Assignee: Lear Corporation, Southfield, MI (US)

( * ) Notice: Subject to any disclaimer, the term of this patent is extended or adjusted under 35 U.S.C. 154(b) by 53 days.

(21) Appl. No.: 10/606,649

(22) Filed: Jun. 26, 2003

(65) Prior Publication Data

US 2004/0263154 A1 Dec. 30, 2004

(51) Int. Cl.
- G08B 21/00 (2006.01)
- G01L 1/00 (2006.01)
- G01G 7/00 (2006.01)
- B60K 28/00 (2006.01)
- G01D 7/00 (2006.01)

(52) U.S. Cl. .................. 340/665; 340/666; 340/667; 702/41; 702/42; 702/173; 180/273; 73/862.041; 73/862.042; 73/862.623

(58) Field of Classification Search ........ 340/665–667; 702/41–42, 173; 280/735; 180/273; 73/862.041, 73/862.623, 862.626
See application file for complete search history.

(56) References Cited

U.S. PATENT DOCUMENTS

| | | | |
|---|---|---|---|
| 4,738,325 A * | 4/1988 | Bullivant et al. .... | 177/210 EM |
| 5,284,061 A | 2/1994 | Seeley et al. | |
| 6,129,168 A * | 10/2000 | Lotito et al. ............ | 180/273 |
| 6,179,378 B1 | 1/2001 | Baumgartner et al. | |
| 6,394,490 B1 | 5/2002 | Osmer et al. | |
| 2001/0010424 A1 | 8/2001 | Osmer et al. | |
| 2002/0050173 A1 | 5/2002 | Taguchi et al. | |
| 2002/0056918 A1 | 5/2002 | Saito | |
| 2002/0100670 A1 | 8/2002 | Ambrose | |
| 2002/0125051 A1 | 9/2002 | Aoki | |
| 2002/0149490 A1 | 10/2002 | Butler et al. | |
| 2002/0157474 A1 | 10/2002 | Babala et al. | |
| 2002/0180463 A1 | 12/2002 | Basir et al. | |
| 2002/0195806 A1 | 12/2002 | Thomas et al. | |
| 2003/0000312 A1 | 1/2003 | Ono | |
| 2003/0005775 A1 | 1/2003 | Washeleski et al. | |
| 2003/0220766 A1 * | 11/2003 | Saunders et al. ........... | 702/173 |

FOREIGN PATENT DOCUMENTS

| | | |
|---|---|---|
| EP | 0 670 239 | 9/1995 |
| EP | 0 728 636 | 8/1996 |
| WO | 98/35861 | 8/1998 |
| WO | 98/41424 | 9/1998 |

* cited by examiner

Primary Examiner—Daniel Wu
Assistant Examiner—Lam Pham
(74) Attorney, Agent, or Firm—MacMillan, Sobanski & Todd, LLC

(57) ABSTRACT

A sensor assembly for use in a vehicle seat cushion for detecting the presence of an occupant includes a first member defining an internal bore. A second member has a portion slidably disposed in the bore of the first member. The first member is movably mounted relative to the first member about an axis. A spring biases the first member relative to the second member. A sensor device is mounted in one of the first and second members.

20 Claims, 3 Drawing Sheets

SPRING SENSOR ASSEMBLY FOR A VEHICLE SEAT CUSHION

BACKGROUND OF THE INVENTION

This invention relates in general to a vehicular seat assembly having a flexible air bag suppression sensor apparatus. More specifically, this invention relates to a spring sensor assembly of the sensor apparatus.

Vehicular air bags play an important role in restraining a seat occupant in vehicular crash situations. However, air bags designed for adequately restraining a large sized occupant may not provide optimal restraint protection for a smaller sized occupant or for a child occupying a child seat. In addition, the deployment of an air bag corresponding to an unoccupied seat represents an unnecessary repair expense.

Sensor apparatuses have been proposed for detecting whether or not a given seat is occupied. These types of sensor apparatuses act as on/off switches in controlling the deployment of a corresponding air bag. However, these types of sensor apparatuses simply address the need for preventing the deployment an air bag when the seat is unoccupied.

Other sensor apparatuses have been proposed to detect the placement of an occupant in a given seat for the purpose of suppressing the deployment of a corresponding air bag. Specifically, these types of sensor apparatuses detect whether or not the front and/or rear portions of a given seat are occupied. In situations in which only the front or only the rear portion of the seat is occupied, a sensor apparatus provides a signal for controlling the degree in which the air bag is to be suppressed during deployment. However, these sensor apparatuses do not provide a means for suppressing the air bag when both the front and rear portions of the seat are occupied.

Other sensor apparatuses have been proposed which determine the weight of an occupant based on detected variations in seat occupancy loading for providing a means of controlling the degree in which a respective air bag is to be suppressed during deployment. However, these types of sensor apparatuses require that a sensor apparatus be directly mounted to the structure of a given seat and that the sensor apparatus itself be structural. Consequently, these sensor apparatuses are relatively massive. Additionally, these sensor apparatuses are typically sensitive to physical and environmental changes that affect the repeatability of the performance of the sensor apparatus.

Other sensor apparatuses include a flexible sensor apparatus mounted to a seating face of a seat cushion. The flexible sensor apparatus includes a plurality of sensors imbedded at various locations of the vehicle seat cushion. These sensors, along with a microprocessor and an appropriate algorithm, are generally capable of detecting both the size of a passenger and the presence of an occupied child seat for the purpose of controlling the degree in which a corresponding air bag is to be suppressed during deployment. The flexible sensor apparatus offers improved reliability, as well as the advantages of being nonstructural and compact. However, the individual sensors are commonly affected by shear forces within the seat cushion, which may lead to false signals. The plurality of sensors are also difficult to install properly onto the sensor apparatus.

BRIEF SUMMARY OF THE INVENTION

This invention relates to a sensor assembly for use in vehicle seat cushions for detecting the presence of an occupant. The sensor assembly includes a first member defining an internal bore. A second member has a portion slidably disposed in the bore of the first member. The first member is movably mounted relative to the first member about an axis. The assembly further includes a spring biasing the first member relative to the second member. A sensor device is mounted in one of the first and second members.

The invention also includes a method of assembling a sensor assembly in which different springs may be used with common housing architecture such that various different sensors can be formed by simply altering the springs of the assembly. A first sensor assembly is provided having first and second members movably mounted relative to one another. One of a plurality of springs is selected having different spring constants. One of a plurality of springs is installed in the sensor assembly, such that the spring biases the first member relative to the second member. A sensor device is installed in one of the first and second members. The sensor assembly is then mounted onto a mat adjacent a hall effect sensor attached to the mat. The mat can then by installed on a vehicle seat cushion. A second sensor assembly can then be created by providing a second sensor assembly including first and second members having the same dimensions as the first and second members of the first sensor assembly. Another one of a plurality of springs is selected having a different spring constant than the spring installed in the first sensor assembly. Instead of installing different springs, the present invention also includes a method assembling a sensor assembly in which different magnets may be used with common housing architecture such that various different sensors can be formed by simply altering the magnets having different gauss characteristics.

Various objects and advantages of this invention will become apparent to those skilled in the art from the following detailed description of the preferred embodiment, when read in light of the accompanying drawings.

DETAILED DESCRIPTION OF THE INVENTION

Figure 1:
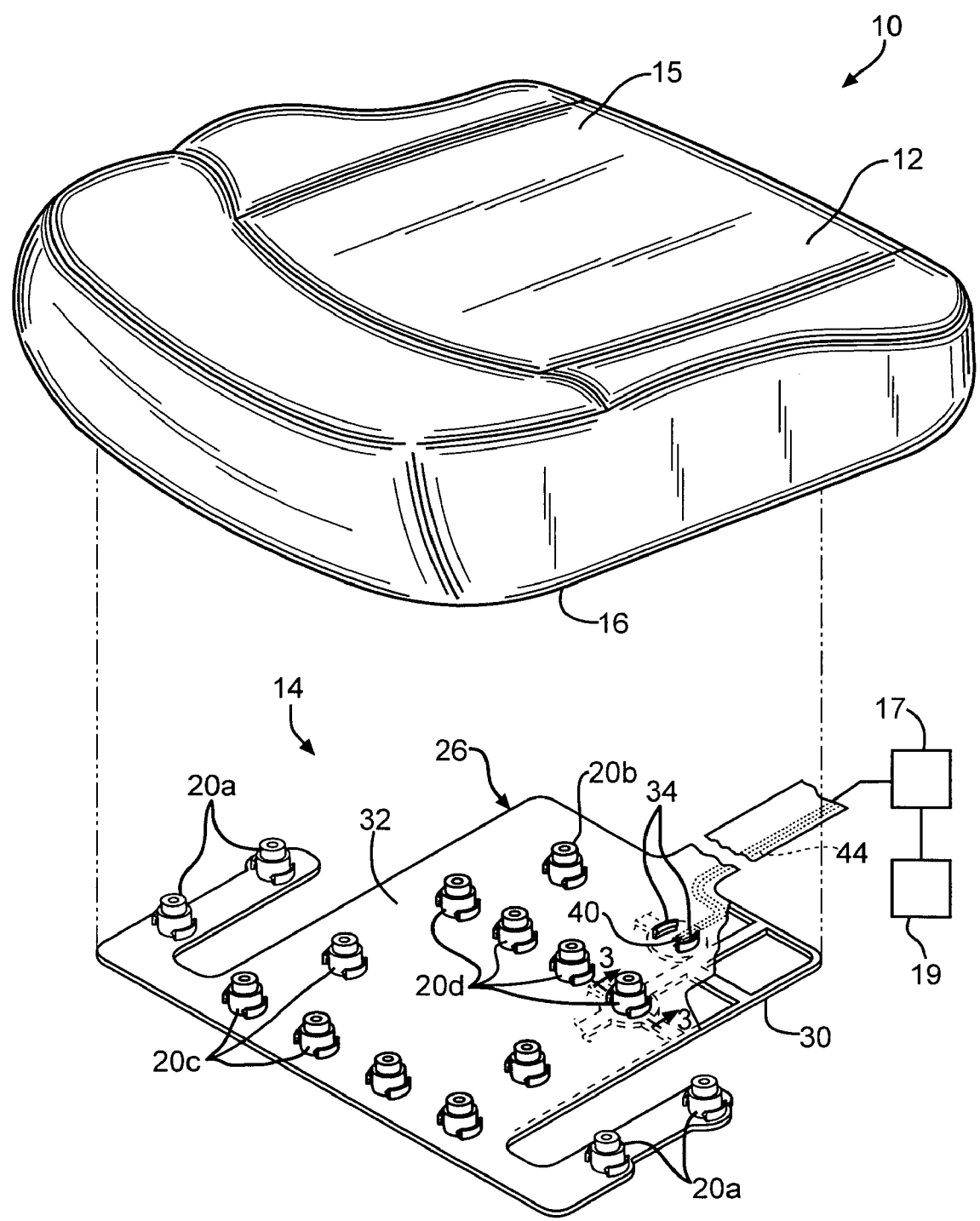
FIG. 1 is an exploded perspective view of a vehicle seat cushion assembly including a flexible sensor mat attached to a seat cushion, wherein the flexible mat includes a plurality of sensor assemblies in accordance with the present invention.

Referring now to the drawings, there is illustrated in FIG. 1 a seat cushion assembly indicated generally at 10. The assembly 10 includes a seat cushion 12 and a sensor mat assembly 14 mounted in the cushion 12. The seat cushion 12 can have any desired contoured shape and is adapted to be mounted on a vehicle seat frame (not shown). As will be explained in detail below, the mat 14 includes a plurality of sensor assemblies 20 (20a, 20b, 20c, and 20d) which detect the presence of an occupant seated on the seat. The sensor assemblies 20 include movably mounted members which detect displacement therebetween caused by the weight of occupant seated on the cushion 12. The sensor assemblies 20 are electrically connected to a controller 17, such as a microprocessor. The controller 17 receives sensor input from the sensor assemblies relating to the weight of the occupant caused by the force transmitted through the cushion 12. Since the mat assembly 14 preferably includes a plurality of sensor assemblies 20, the sensor input may also determine the position of an occupant relative to the cushion 12, for example, whether the occupant is seated far forward in the seat. The sensor input may also be used to determine whether a person or an object is seated on the cushion 12. Based on the reading from the sensor assemblies, the controller 17 controls the operation of a device 19 mounted in the vehicle. The device 19 can be any device which is actuated based on the readings from the sensor assemblies 20. An example of a device 19 is an air bag module. In this case, the controller 17 determines from the sensor input whether or not to actuate the air bag or to control the deployment force of the air bag. For example, if the sensor assemblies 20 detect the presence of a small adult or child, the controller may stop deployment of the air bag during a detected vehicle impact condition or, alternatively, the controller may actuate the air bag to deploy at a lower force than if a larger adult was detected.

The cushion 12 has an upper seating surface 15. The seat cushion 12 also includes a lower or downwardly facing surface 16. The seat cushion 12 can be formed of any suitable layers of material, such as a foam layer and an outer trim material, which permit the transfer of the force from an object resting on the cushion to be transferred to the sensor assemblies 20. Preferably, the cushion 12 includes grooves or indentations (not shown) formed in the lower surface 16 for receiving the sensor assemblies 20. Thus, the mat assembly 14 can be simply positioned on the lower surface 16 with the sensor assemblies 20 extending upwardly into recesses of the cushion 12. It should be understood that the sensor assemblies 20 can be positioned at any suitable position within the cushion 12 which enables forces from the weight of an occupant of the cushion assembly 10 acting on the upper surface of the cushion 12 to be transferred through the cushion and onto the sensor assembly 20. For example, the mat assembly 14 could be molded into the foam material of the cushion 12.

Preferably, the mat assembly 14 includes a mat 26 having a lattice type substrate 30 and a covering 32 mounted on and above the substrate 30. The substrate 30 defines a plurality of mounting locations for the mounting of each sensor assembly 20. As best shown in FIG. 1 by hidden lines, the mounting locations are located at intersections of the lattice type substrate 30 and include integral mounting features formed therein, such as for example resilient mounting tabs 34. As will be explained in detail below, the tabs 34 mate with cooperating mounting features of the sensor assemblies 20 to attach the sensor assemblies 20 to the mat 26. It should be understood that the sensor assemblies 20 can be mounted on the mat 26 by any suitable manner.

Figure 3:
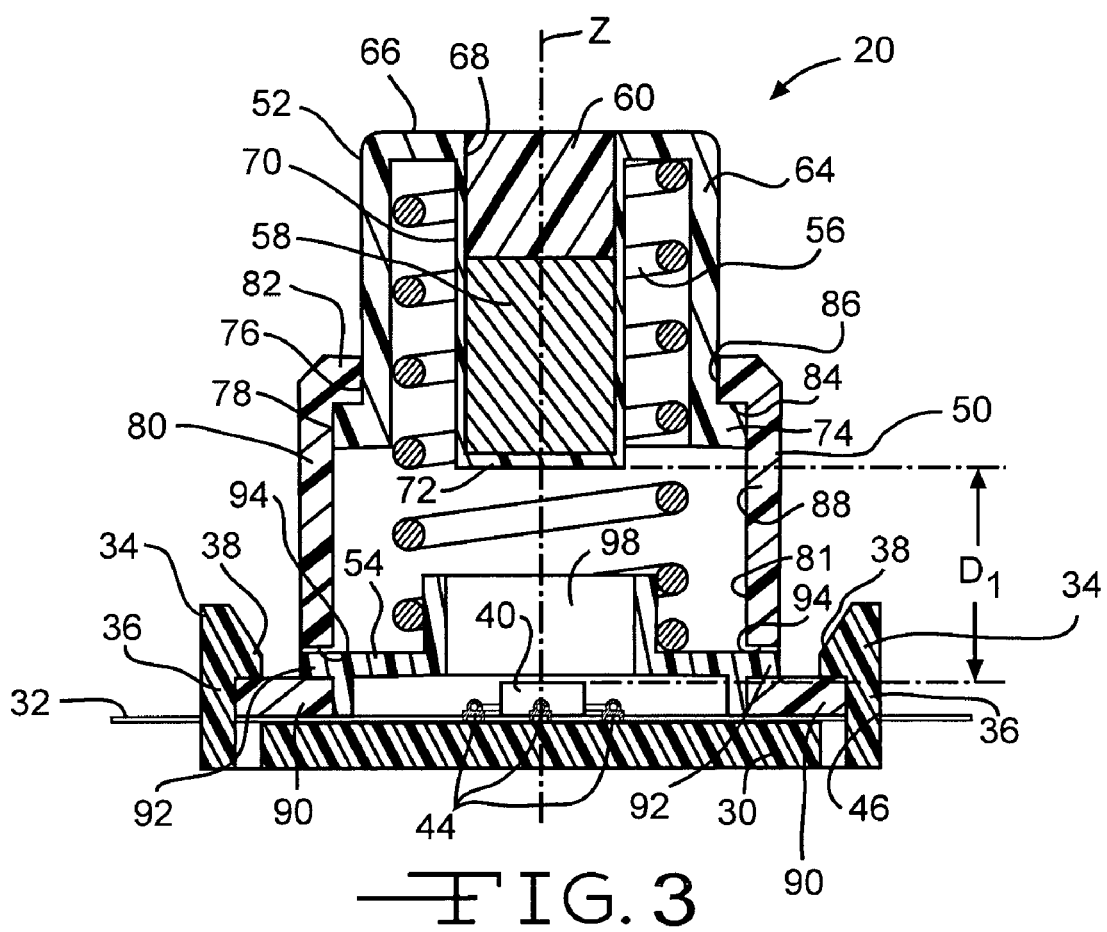
FIG. 3 is a cross-sectional view of a portion of the mat and a sensor assembly apparatus taken along lines 3—3 in FIG. 1.

The substrate 30 can be made of any suitable material, such as plastic, to provide a generally rigid structure for mounting and positioning the sensor assemblies 20 relative to one another. As best shown in FIG. 3, the mounting tabs 34 of the substrate 30 include a generally vertical portion 36 and a hook portion 38, the reason for which will be explained in detail below. As shown in FIG. 1, each mounting location includes a pair of tabs 34 for receiving a sensor assembly 20. In the embodiment of the mat 26 illustrated in FIG. 1, there are sixteen mounting locations. For clarity purposes, one of the mounting locations is shown without a sensor assembly 20 attached thereto. The mounting locations can be formed at any suitable position relative to the other sensor assemblies 20 for providing desired sensor readings or input. For example, it has been found that a pair of sensor assemblies 20a mounted at each side of the cushion 12 provides adequate sensor input for detection of forces exerted on the side bolster portion of the cushion. The embodiment of the mat assembly 14 also includes a pair of rearwardly positioned sensor assemblies 20b (one not shown), six frontal sensor assemblies 20c, and four intermediate sensor assemblies 20d. Of course, any number of sensor assemblies 20 can be used and positioned at any location on the mat assembly 14.

The covering 32 can be formed of any suitable material, such as plastic, and may be attached to the substrate 30. The covering 32 provides for a convenient manner of mounting sensor devices 40, such as a hall effect sensors, relative to the substrate 30 at each mounting location. As will be explained in detail below, the sensor device 40 cooperates with another sensor device, such as a magnet, movably mounted in the sensor assembly 20 to provide sensor input relating to the displacement of a portion of the sensor assembly which relates to the force exerted on the sensor assembly 20. The covering 32 can also include electrical wiring 44 either attached thereto or embedded therein for electrically connecting the sensor device 40 to the controller 17. The covering 32 includes openings 46 formed therein to permit the tabs 34 of the substrate 30 to extend upwardly therethrough.

Figure 2:
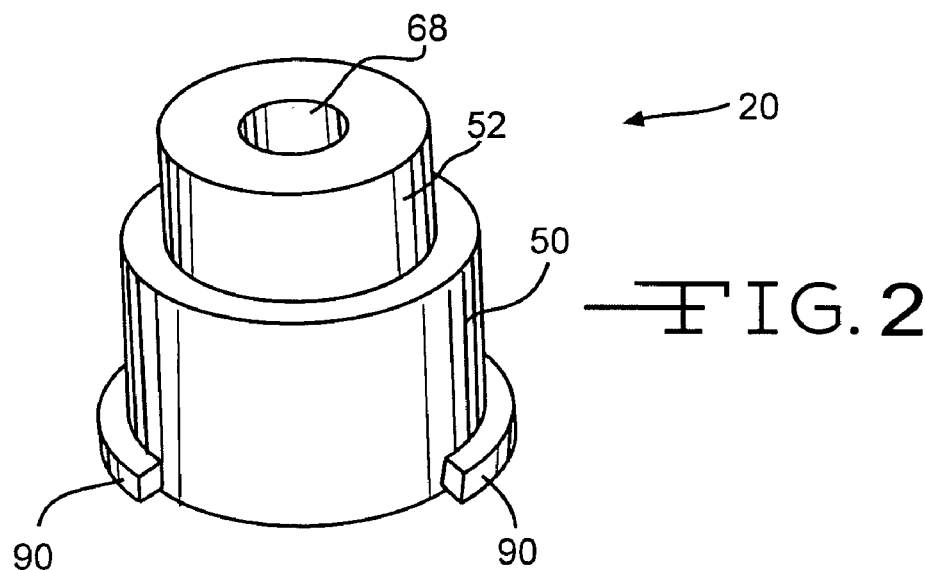
FIG. 2 is a perspective view of an embodiment of a sensor assembly for use with the sensor mat of FIG. 1.

Referring to FIGS. 2 and 3, the sensor assembly 20 includes a stepped generally cylindrical housing generally having three members: a main body 50, an upper cap 52, and a lower closure member 54. The cap 52 is telescopically slidably disposed in the body 50 about an axis Z, generally relating to a vertical axis. For reasons explained below, the sensor assembly 20 further includes a spring 56, a sensor device, such as a magnet 58, and an optional plug 60 all disposed within the interior of the housing.

The cap 52 includes an outer cylindrical wall 64 and a circular shaped upper surface 66. The upper surface 66 includes a central opening 68 formed therein. A generally tubular extension 70 extends downwardly from the upper surface 66 and is in communication with the opening 68. The tubular extension 70 can be closed off at the lower portion thereof by a circular wall 72. Alternatively, the circular wall 72 may include an opening formed therein. The cap 52 also includes a lip 74 at the lower portion thereof which extends radially outwardly from the cylindrical wall 64, the reason for which will be explained below. The cylindrical wall 64 defines a first cylindrical outer surface 76. The lip 74 defines a second cylindrical outer surface 78 having a diameter which is greater than the diameter of the first outer surface 76. The magnet 58 is disposed in the tubular extension 70. If desired, the sensor assembly 20 can include the plug 60 for closing off the opening 68 to help retain the magnet 58 in the tubular extension 70 of the cap 52.

The main body 50 includes an outer cylindrical wall 80 defining an inner bore 81. The body 50 also includes a flange 82 extending radially inwardly from the upper portion of the wall 80 to define a shoulder 84. The flange 82 defines a first inner cylindrical surface 86. The wall 80 defines a second inner cylindrical surface 88 having a diameter which is greater than the diameter of the first inner cylindrical surface 86.

The body 50 further includes a pair of outwardly extending flanges 90 which mate with the tabs 34 to mount the sensor assembly 20 to the mat 26. The sensor assembly 20 can be mounted on the mat 26 by rotating the body 50 until the flanges 90 are captured underneath the hook portion 38 of the tabs 34. Alternatively, the flanges 90 can be captured underneath the hook portions 38 by a snap fit arrangement in which the body 50 is pressed downwardly over the tabs 34 such that the vertical portions 36 flex to permit the flange 90 to slide downwardly until the hook portion 38 snaps back into position. Of course, the sensor assembly 20 can include any other suitable mounting arrangement.

As shown in FIG. 3, the closure member 54 closes off the bottom portion of the body 50. The closure member 54 can include outwardly extending ears 92 which are flexibly inserted into apertures 94 formed in the wall 80 of the body 50, thereby removably attaching the closure member 54 to the body 50. The closure member 54 also includes an upwardly extending cylindrical tubular extension 98.

Figure 4:
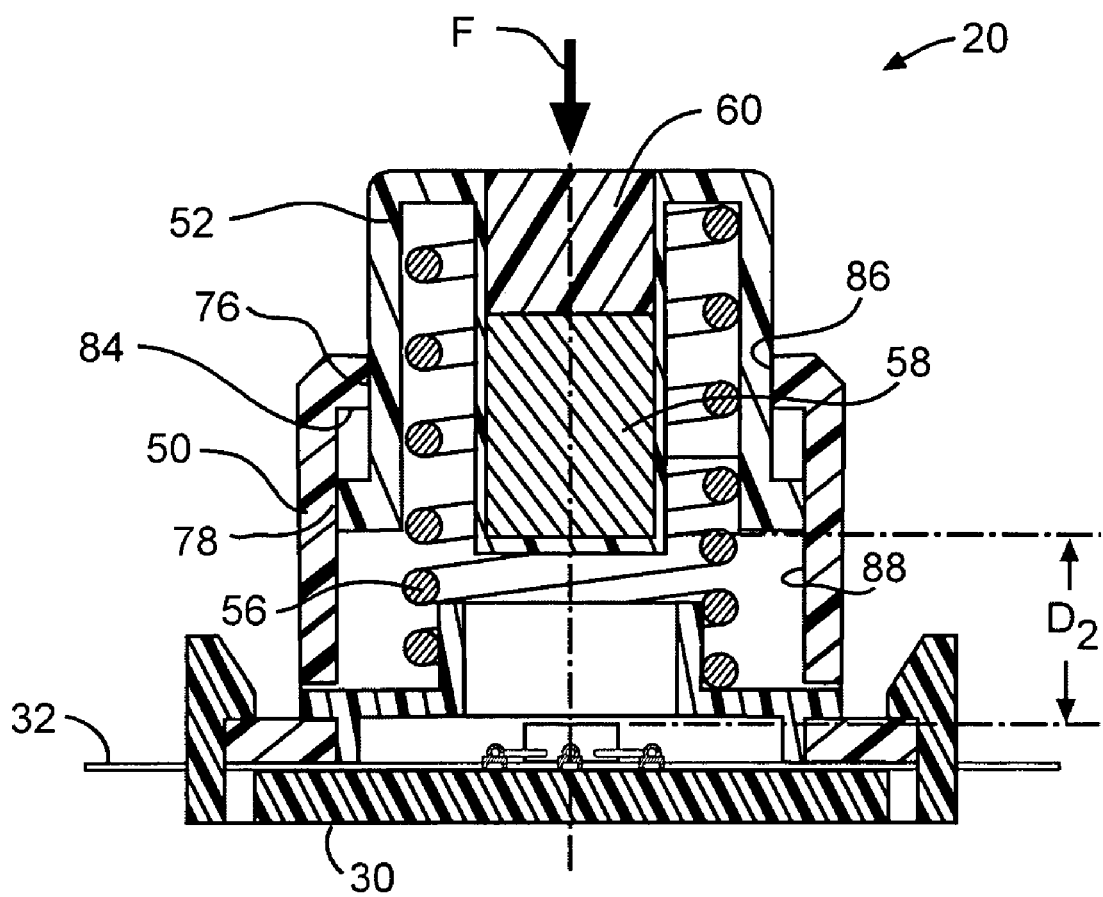
FIG. 4 is a cross-sectional view of the mat and sensor assembly of FIG. 3 wherein the cap of the sensor assembly is shown in a displaced position.

Prior to attachment of the closure member 54, the spring 56 is inserted into the interior of the body 50 and the cap 52. The spring 56 biases the cap 52 upwardly relative to the body 50 such that the lip 74 engages with the shoulder 84. The spring 56 can be any suitable spring structure, such as a coil spring, which biases the cap 52 upwardly relative to the body 50. This positions the magnet at a predetermined distance $D_1$ from the hall effect sensor 40 when the sensor assembly 20 is mounted on the mat 26. The sensor assembly 20 illustrated in FIG. 4 is shown in a "loaded" position, such that a force F acts upon the cap 52 to slidably move the cap 52 into the interior of the body 50 against the return force of the spring 56 such that the magnet 58 is at a distance $D_2$ from the hall effect sensor 40. The hall effect sensor 40 detects the displaced position of the magnetic field generated by the magnet 58 relative to the sensor 40, thereby generating a sensor input signal to the controller 17 corresponding to weight or force F acting on the upper surface 66 of the cap 52. The sensor input signal is transmitted via the wiring 44 from the hall effect sensor 40.

One of the advantages of the structure of the sensor assembly 20 is that the cap 52 generally remains in a vertical position along the axis Z during movement of the cap 52 relative to the body 50. It is undesirable to permit the cap 52 to tilt about the axis Z since this movement could effect the distance between the magnet 58 and the sensor 40, thereby emitting a false signal. This consistent vertical movement of the cap 52 relative to the body 50 is provided by the sliding arrangement of the surfaces 76, 78, 86, and 88. These pairs of mating surfaces help prevent the cap 52 from tilting relative to the body 50. There are often shear forces exerted on the sensor assembly 20 from the foam of the cushion 12. It is desirable for the sensor assembly 20 to not move the cap 52 relative to the body 50 when subjected to these shear forces to prevent false or misleading readings.

Another advantage of the sensor assembly 20, is that the interior of the body 50 and the cap 52 define a spring chamber which is sized to accommodate different springs 56 having differing spring constants. It is often desirable to "tune" the mat assembly 14 such that the displacement of the plurality of sensor assemblies 20 do not bottom out or deflect enough to provide proper readings. For example, for the sensor assemblies 20*a* at the side bolsters of the cushion 12 and the rear sensor assemblies 20*b*, it may be desirable to have a lower spring constant, than for the sensor assemblies 20*c* and 20*d*. Thus, a common housing including the same body 50, cap 52, and closure 54 may be used to produce sensor assemblies having different signal output characteristics. To accomplish this, a common sensor assembly 20 housing is first provided. Next, one of a plurality of springs is selected having a desired spring constant ideally suited for the position and type of cushion used. The spring 56 is then installed into the housing of the sensor assembly 20. A sensor device and plug may also be installed. The sensor assembly 20 is then installed on the mat 26 as described above. A second sensor assembly having the same dimensioned body 50, cap 52, and closure 54 is then provided for installing a different spring. The second sensor assembly 20 is then mounted at the appropriate mounting location of the mat assembly 14.

The common housing architecture also permits the selection of different sensor devices 40 to be installed into the sensor assembly 20, in a similar manner as described above with respect to the spring 56. For example, a magnet having a desired gauss characteristic can be chosen from a plurality of magnets having differing gauss characteristics.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A sensor assembly for use in a vehicle seat cushion for detecting the presence of an occupant, said assembly comprising:
    a first member defining an opening;
    a second member having a portion slidably disposed in said opening such that said second member is movably mounted relative to said first member along a predetermined path;
    a spring housed at least in part in said opening, said spring biasing said first member relative to said second member; and
    a sensor device mounted to detect relative movement between said first and second members.

2. The assembly of claim 1 further including a magnet mounted in one of said first and second members.

3. The assembly of claim 2, wherein said sensor device is a hall effect sensor mounted relative to the other one of said first and second member and at a spaced position relative to said magnet, and wherein movement of said first member relative to said second member causes said hall effect sensor to detect the change in position of said magnet.

4. The assembly of claim 1, wherein said spring biases said first member relative to said second member in a direction parallel to said predetermined path.

5. The assembly of claim 1, wherein said spring is a coil spring.

6. The assembly of claim 1, wherein said first member defines a stepped bore having a first internal diameter portion and a second internal diameter portion having a diameter less than the diameter of said first internal diameter portion, said stepped bore defining a shoulder between said first and second internal diameter portions, and wherein said portion of said second member includes an outwardly radially extending lip which is engageable with said shoulder to function as a stop to prevent movement of said first member relative to said second member.

7. The assembly of claim 6, wherein said second member defines a first external diameter portion slidably disposed adjacent said first internal diameter portion, and wherein said second member defines a second external diameter portion slidably disposed adjacent said second internal diameter portion.

8. The assembly of claim 6, wherein said spring biases said lip against said shoulder.

9. The assembly of claim 1, wherein one of said first and second members is adapted to be mounted on a sensor mat, and wherein said sensor device is mounted on said sensor mat.

10. The assembly of claim 9 further including a magnet mounted on one of said first and second members, and wherein said sensor device is a hall effect sensor mounted relative to the other one of said first and second member and at a spaced position relative to said magnet such that movement of said first member relative to said second member causes said hall effect sensor to detect the position of said magnet.

11. The assembly of claim 1, wherein said first and second members define a spring chamber sized to accommodate different springs having differing spring constants.

12. The assembly of claim 1, wherein said second member defines an opening, and wherein said spring is housed in said openings of said first and second members.

13. The assembly of claim 1, wherein said opening of said first member is defined by a cylindrical bore.

14. A sensor mat assembly for use in a vehicle seat cushion for detecting the presence of an occupant, said assembly comprising:
a mat;
a first sensor assembly mounted at a first predetermined location on said mat, and a second sensor assembly mounted at a second predetermined location on said mat, each of said sensor assemblies including:
a first member;
a second member movably mounted relative to said first member along a predetermined path; and
a spring biasing said first member relative to said second member; and
a sensor device to detect relative movement between respective first and second members,
wherein the spring constant of said spring of said first sensor assembly is different from the spring constant of said spring of said second sensor assembly.

15. The assembly of claim 14, wherein each of said sensor assemblies includes a magnet mounted on one of said first and second members.

16. The assembly of claim 14, wherein each of said first members define an opening, and wherein said spring of each of said sensor assemblies is housed at least in part of said opening.

17. The assembly of claim 14, wherein said sensor device of each of said sensor assemblies is a hall effect sensor.

18. A sensor mat assembly for use in a vehicle seat cushion for detecting the presence of an occupant, said assembly comprising:
a mat;
a first sensor assembly mounted at a first predetermined location on said mat, and a second sensor assembly mounted at a second predetermined location on said mat, each of said sensor assemblies including:
a first member;
a second member movably mounted relative to said first member along a predetermined path;
a magnet mounted on one of said first and second members; and
a sensor device mounted to detect the position of said magnet,
wherein the gauss characteristic of said magnet of said first sensor assembly is different from the gauss characteristic of said magnet of said second sensor assembly.

19. The assembly of claim 18, wherein each of said sensor assemblies includes a spring biasing said first member relative to said second member.

20. The assembly of claim 19, wherein each of said first members define an opening, and wherein said spring of each of said first and second sensor assemblies is housed at least in part of said opening.

* * * * *